INVENTORS
RENE P. CACHON
JOSEPH C. MILLER
LEONARD S. SHEINER

BY Harry Powers
ATTORNEY

Aug. 25, 1970 R. P. CACHON ET AL 3,525,140

MICRO-MOTION DEVICE

Filed May 22, 1968 2 Sheets-Sheet 2

United States Patent Office 3,525,140

Patented Aug. 25, 1970

3,525,140

MICRO-MOTION DEVICE

Rene P. Cachon, Wappingers Falls, Joseph C. Miller, Poughkeepsie, and Leonard S. Scheiner, Wappingers Falls, N.Y., assignors to International Business Machines Corporation, Armonk, N.Y., a corporation of New York Filed May 22, 1968, Ser. No. 731,233
Int. Cl. B23p *19/00;* H05k *13/00*
U.S. Cl. 29—200 10 Claims

ABSTRACT OF THE DISCLOSURE

A micrometric translator for ultra-minute motion having selectively coarse and fine modes of operation. The device is a differential-type twin screw device incorporating a clutch continuously engaged with one screw member and selectively engageable and disengageable with a second screw member. When the clutch is disengaged from the cooperative screw member coarse and rapid linear motion is provided by the device; and, conversely, with the clutch engaged with both screw members relatively fine and slow linear motion is obtained for precise operation which permits mehcanical translation as small as the wavelength of light.

FIELD OF THE INVENTION

This invention relates to precision micro-motion devices, and more particularly to a micrometric translator for providing small displacements of an object.

DESCRIPTION OF THE PRIOR ART

In various operations it is necessary to accurately position an object or workpiece relative to some reference system. For this purpose various micrometric devices have been provided for providing precise and limited movement of an object in minute stages in a given direction. Typical of such operations is the use of such positioning devices for displacement of a microscope stage, and in conjunction with machine tools to move a workpiece or a machine tool through precise and minute increments into accurate positions relative to each other. Another application of such micro-motion devices of particular interest comprehended within this invention is in the manufacture of semiconductor devices in which a wafer must be precisely located relative to a mask for art-work reproduction, particularly where an array of a large number of miniaturized semiconductor chips such as integrated circuits are to be concurrently fabricated on a single wafer. Various micrometer devices to effectuate such positioning have been used to this purpose, including various micrometer devices, differential screw devices and the like. However, all of such devices have been characterized by micro-incremental or minute stages of travel or advance which necessitate relatively long periods for attaining final alignment or positioning of an object.

SUMMARY OF THE INVENTION

The micro-motion device of this invention comprises a novel micrometer screw mechanism which incorporates a rotary driven fine threaded plunger independently mounted within an oppositely rotary driven relatively coarse threaded barrel member which, together function as a differential screw-type device. The device includes a clutch drive for the fine threaded plunger for conjoint rotation with the barrel member which is rotatable at all times. Disengagement of the clutch permits the rapid action of the coarse threaded barrel member to be employed for a rapid preliminary initial positioning, which, when followed by engagement of the clutch with the finer threaded plunger, permits slow fine positioning by the differential action between the fine threaded plunger and the coarse threaded barrel.

Accordingly, it is an object of this invention to provide a micro-metric translating device capable of precise and accurate linear motion.

It is another object of this invention to provide a micrometric device capable of translating rotary movement into a reduced small linear movement of precise and minute displacements.

Another object of this invention is to provide a micropositioning mechanism having an independently suspended and driven differential screw arrangement of which one screw device may be selectively driven alone for a rapid coarse adjustment or conjointly driven with a second screw device for relative slow fine adjustment.

A further object of this invention is to provide a novel micropositioning differential-type screw device capable of translating rotary movement into a reduced ultra-minute linear movement.

A still further object of this invention is to provide a micropositioning mechanism capable of selectively translating a rotary movement into a rapid coarse linear movement and relatively ultra-minute movement of the order of a wavelength of light.

The foregoing and other objects, features and advantages of the invention will be apparent from the following more particular description of the embodiment of the invention, as illustrated in the accompanying drawings.

In the drawings:

DESCRIPTION OF THE PREFERRED EMBODIMENT

Figure 1:
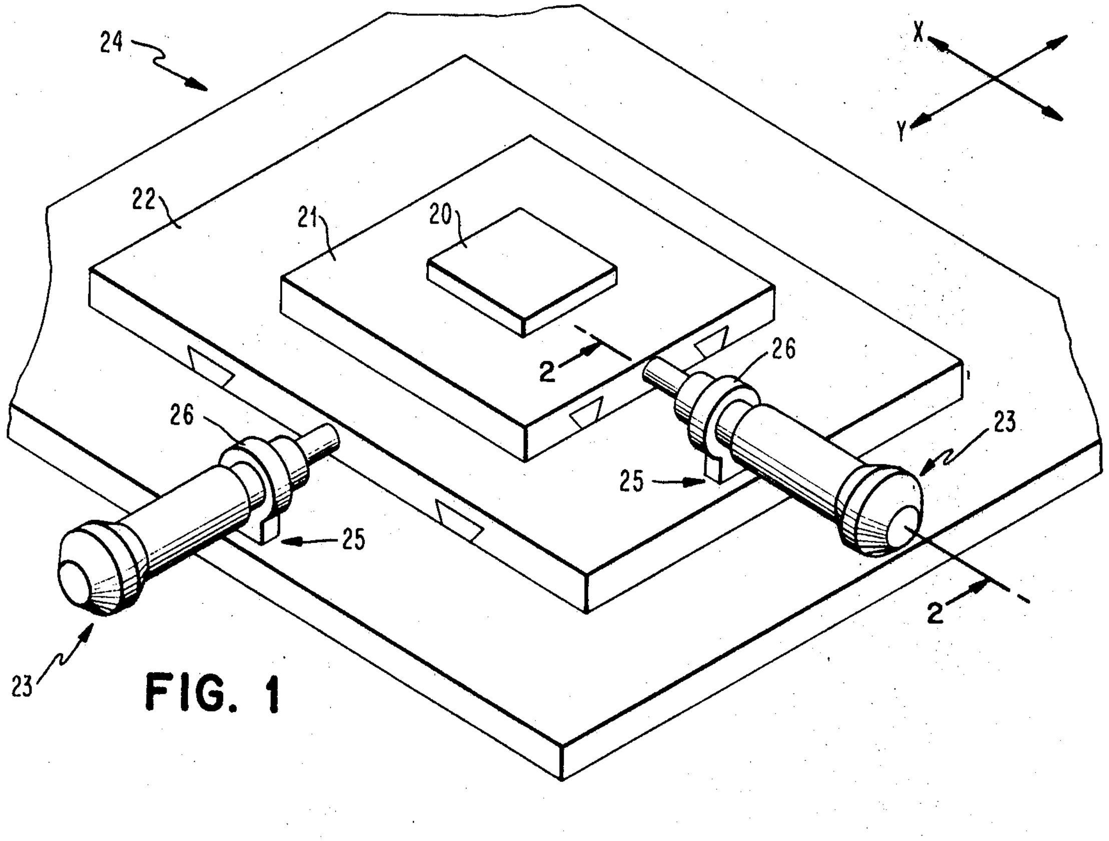
FIG. 1 is a diagrammatic view in perspective of an X–Y micropositioning system for an object embodying a micrometric device of this invention.
Figure 3:
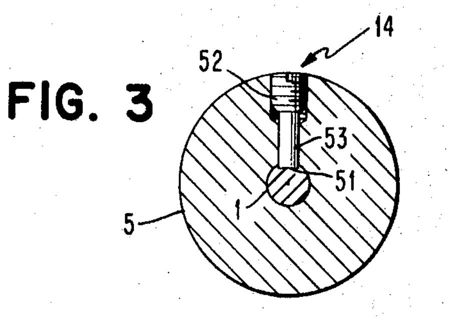
FIG. 3 is a cross-sectional view taken along line 3—3 of FIG. 2.
Figure 4:
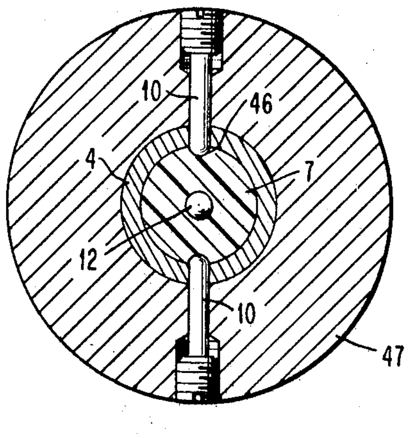
FIG. 4 is a cross-sectional view taken along line 4—4 of FIG. 2.
Figure 2:
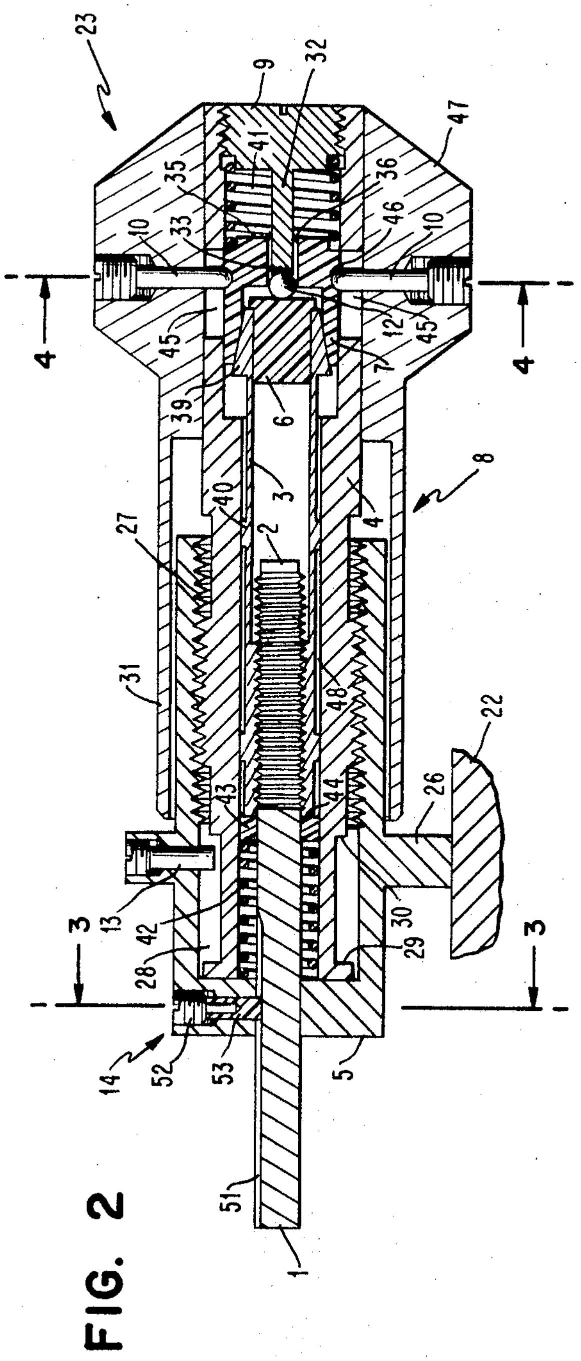
FIGS. 2 and 2A are cross-sectional views of a micrometric device of this invention shown in two operative conditions.

Referring to FIG. 1 there is shown an X–Y positioning system in which a workpiece 20 such as a semiconductor wafer, which is to be accurately positioned in the X–Y reference plane, as for example, into precise position relative to a mask (not shown) conventionally used in the manufacture of miniaturized integrated or printed circuits. The workpiece 20 is held in place on a movable work stage assembly 24 which can include support plate 21 movable in the X-direction and a platform 22 movable in the Y-direction. The support plate 21 and platform 22 are translated or moved in the X and Y directions by the micropositioning device 23 shown in more detail in FIG. 2.

The coupling of the micropositioning devices 23 is shown only in schematic fasion since it can be readily accomplished by any of the many conventional means known in the art. For example, the work stage assembly may be mounted on a suitable support or frame to which the micropositioning devices may also be mounted as shown graphically at 25.

The micropositioning device 23 includes a tubular body support 5 provided with a collar or other extension 26 for suitable mounting to the main framework (not shown) of a positioning machine or mechanism. Threadedly mounted within the tubular support 5 by means of relatively coarse threads 27 (a pitch of 48 threads per inch) is a tubular barrel member 4 annularly recessed at 28 to define shoulders 29 and 30 for limiting the travel stroke of barrel member 4 by operative coaction with limit pin 13 mounted in the body support 5 and extending into the annular barrel recess 28.

Mounted about the tubular support 5 is an extending skirt 31 of a control spindle 8 having an enlarged tubular head portion externally knurled to facilitate manual rotation thereof. As will be noted, the barrel member 4 extends through the bore of the spindle head portion, and is provided with a threadedly secured cap or closure member 9 formed with an internally projecting extension 32 provided at its distal end with a conical recess 33 to form an axial seat for a thrust bearing 12.

Contained within barrel member 4 is a cup shaped clutch drive 7 provided in its close end 35 with a bore 36 through which is inserted the extension 32 of barrel cap closure 9. The inner walls of the open end of the clutch drive 7 are outwardly tapered in a conical configuration to be seated in driving engagement about an enlarged sleeve head 39 of a drive sleeve 3 slideably and rotatably mounted within barrel member 4 by means of the peripheral sleeve ribs 40. The sleeve head 39 has an external truncated conical configuration for frictionally driving engagement with the complementary internal configuration of clutch drive 7. To reduce slippage between the sleeve head 39 and the clutch 7, the mating surfaces can be suitably roughened to increase friction therebetween. In addition, the frictional engagement between the units can be additionally increased by fabrication of the clutch 7 from materials having higher coefficients of friction, as for example, phenolics, brake lining material, and the like.

The clutch member 7 is yieldingly biased into operative engagement with the sleeve head 39 by a compression spring 41 mounted between the closed end 35 of clutch drive 7 and the barrel closure cap member 9 about the cap extension 32.

In turn, the drive sleeve 3 is oppositely biased into engagement with clutch drive 7 by means of a coil spring 42 interposed between the end of the tubular support 5 and a suitable bearing 43, such as nylon and the like, positioned at the opposite end 44 of the drive sleeve 3.

Continuous rotation drive for the barrel member 4 is effected by means of longitudinal slots 45 mounted for limited axial travel about the drive pins 10 which are threadedly secured in the knob portion of spindle 8 and extend into fixed engagement with the clutch member 7, as by secure insertion of the drive pins 10 within recesses 46 in clutch 7 by threaded adjustment of the drive pins 10 within the spindle head 47. As can be seen by the arrangement, rearward extension of spindle 8 permits limited axial movement of drive pins 10 within the barrel slots 48 without disengagement thereof for maintaining rotation of barrel member 4 during concurrent rotation of spindle 8. This permits translation of the rotation into a relative rapid linear movement by virtue of the coarse thread engagement between the barrel member 4 and the tubular support 5.

Figure 2A:
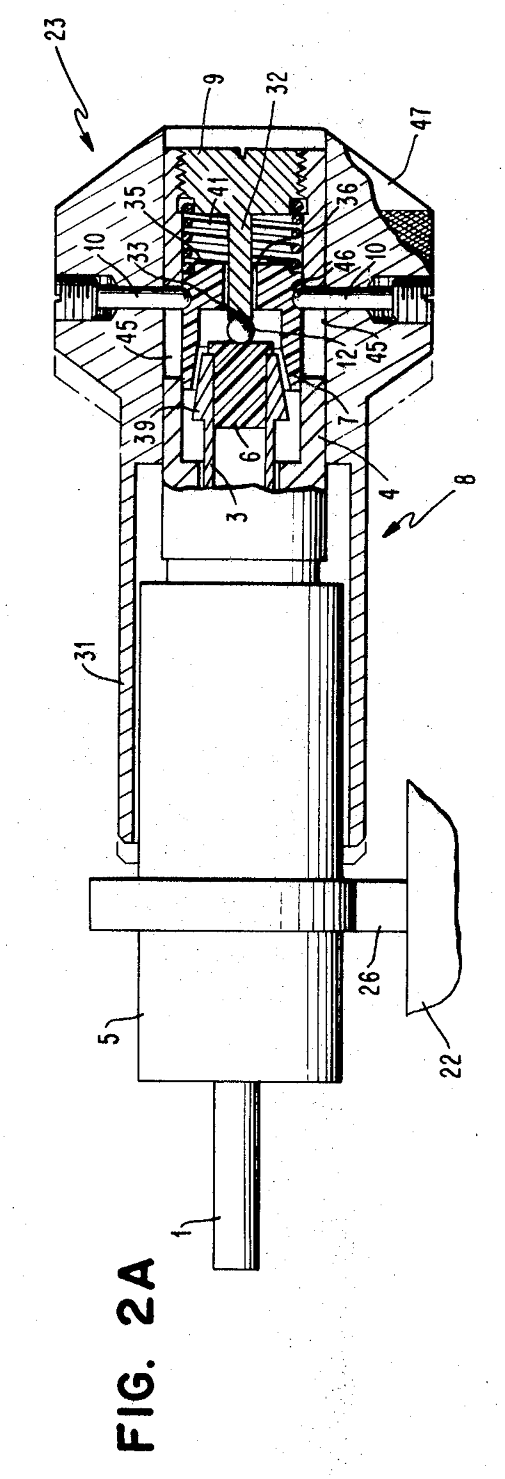

Concurrently, with rearward extension of spindle 8, the drive pins 10 thereof, drive the clutch member 7 rearwardly for disengagement with the sleeve member 3. The sleeve member 3 is prevented from following the rearward movement of clutch drive 7 by means of a cap closure 6, in sleeve member 3, which remains in abutment with the thrust bearing 12 seated in the recessed seat 33 of the extension 32. Thus by preventing rearward movement of the sleeve member 3, the clutch member 7 can be disengaged from the sleeve member 3, whereby only the barrel member 4 is driven on rotation of spindle 8. This disengagement of the clutch 7 from the sleeve member 3 is shown in FIG. 2A. Also, as can be seen in the drawing, the sleeve member 3 will be maintained in a fixed longitudinal position within barrel member 4 during rotation thereof regardless of the engagement or disengagement of clutch member 7 relative to the sleeve member 3.

Threadedly mounted within the sleeve member 3 by means of fine threads 2 having a different pitch, as for example 41.175 threads per inch is a probe or plunger 1 secured against rotation by means of a keyway 51 in which rides a key assembly threadedly secured in the tubular support 5.

In the form shown, the key assembly 14 includes a plunger 52 embedded within a suitable material 53 having preferably, a low co-efficient of friction, such as nylon and the like, to reduce friction, as the key assembly 14 slides along the keyway 51.

Thus with clutch member 7 in engagement with sleeve member 3, rotation of spindle 8 will effect joint rotation of both the barrel member 4 and sleeve member 3. Rotation of barrel member 4 is translated into linear movement thereof. Conversely with rotation of the probe or plunger 1 restricted, rotation of the sleeve member 3 is translated into linear movement of the probe or plunger 1. The use of different pitch threads for mounting of barrel member 4 and probe 1 results is differential movement therebetween. However, it is to be understood that both threads may be forwardly directed or one may be the reverse pitch of the other.

By virtue of the construction above described, the micropositioner of this invention operates as a differential screw for fine alignment during engagement of clutch member 7 with the sleeve member 3, whereby it can function (with the pitches noted) in the same manner as an 1100 pitch screw approximately 0.0001 inch per revolution. By disengagement of clutch member 7 from the sleeve member 3, the positioner can function as a pitch screw, e.g. .025 inch per revolution. In this manner, the operator can switch from a fine to coarse adjustment by just pulling on the spindle knob 47 and holding it in the extended position as the spindle 8 is rotated. After a preliminary coarse adjustment is made (as positioning a semiconductor wafer and mask within ±0.010 inch of each others centers), only a half of a revolution of the positioner is required in the extended position to bring the operator into range for fine adjustment by merely releasing the clutch member 7 into engagement with the sleeve member 3.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A micrometric translating device comprising:

(A) a support;

(B) a tubular barrel member mounted to and axially movable at a first rate relative to said support;

(C) an elongated probe means mounted in said barrel member and independently axially movable therein;

(D) a first dependent rotatable drive means within said barrel member for axially moving said probe means in a direction opposite to that of said barrel member with the axial movement of said probe means having a rate different than that of said barrel member to provide differential movement therebetween;

(E) clutch means for connection to said first drive means; and (F) a second independent drive means for conjointly driving said first drive means and said barrel member to effect said relative axial movement between said barrel member and said probe means with said second drive means including (a) a control means for selective connecting and disconnecting said clutch means from said first drive means.

2. A micrometric translating device comprising a differential screw mechanism including:
(A) an internally threaded tubular housing;
(B) an externally threaded barrel member in threaded engagement with the interior of said housing for rotational and axial movement therein;
(C) an elongated plunger;
(D) internally threaded support means for mounting said plunger therein for imparting independent axial movement to said plunger within said barrel member;
(E) drive means operatively connected to said barrel means for rotation thereby to effect axial movement of said barrel member relative to said housing; and
(F) clutch means for selectively and operatively connecting and disconnecting said drive means with said support means to
(a) axially move said plunger in conjoint relative movement thereof with said barrel member during operative connection of said drive means with said support means, and
(b) maintain the relative positions of said plunger and said barrel member fixed during rotation of said barrel member when said drive means is operatively disconnected from said support means.

3. The device of claim 2 wherein said axial movements of said barrel member and said plunger are in opposite directions and at different rates so as to retract the latter into the former during conjoint rotation of said barrel and support means.

4. A micrometric translating device comprising:
(A) an internally threaded tubular housing closed at one end and open at the other end thereof;
(B) a barrel member threadedly mounted for rotational and axial movement in said housing and extending outwardly at the open end therefrom;
(C) a rotatable tubular spindle having a depending skirt extending over said housing;
(D) an internally threaded sleeve member slidably and rotationally mounted within said barrel member;
(E) limit means at the extended end of said barrel member for maintaining said sleeve in a fixed relative axial position within said barrel member;
(F) a plunger threadedly mounted in said sleeve member and slidably projecting externally out of the closed end of said housing;
(G) a guide member on said housing for restraining rotation of said plunger and permitting relative axial movement therebetween;
(H) means operatively connecting said spindle to said barrel member for rotation thereof into its said translated axial movement relative to said housing; and
(I) clutch means for selective connecting and disconnecting said drive means to said sleeve member to
(a) rotate said sleeve member to cause conjoint axial movement of said plunger relative to and with said barrel member during operative connection of said drive means with said sleeve member, and
(b) maintain the relative axial positions of said plunger and said barrel member during rotation of the latter when said drive means is operatively disconnected from said plunger.

5. The device of claim 4 wherein the axial movements of said barrel member and said plunger are in opposite directions and at different rates so as to restrict the latter into the former during conjoint rotation of said barrel and sleeve members.

6. The device of claim 4 wherein:
(A) said barrel member includes longitudinally extending slots in said barrel member, and wherein
(B) said rotatable spindle includes drive pins secured to said spindle and extending through said slots into cooperative relationship with said clutch member with said slots adapting said barrel member for limited axial movement relative to said spindle about said drive pins.

7. The device of claim 6 wherein said clutch means comprises an axially movable member adjacent the extended end of said barrel member and adapted for driving engagement with the adjacent end of said sleeve member; and including
(A) an aperture extending axially in said clutch member;
(B) said sleeve member including end closure means for the said adjacent end of said sleeve member;
(C) a second end closure means for the extended end of said barrel member and including
(a) an extension projecting internally of said barrel member through said clutch aperture toward said first end closure means;
(D) bias means mounted within said barrel member between the closed end of said housing and said sleeve member for urging the latter toward said clutch member for driving engagement therewith;
(E) a second bias means in said barrel member between said second end closure and said clutch member for yieldingly urging the latter toward said adjacent end of said sleeve member for driving engagement therewith; and
(F) a thrust bearing interposed between the distal end of said extension and said first end closure means.

8. The device of claim 7 wherein the axial movements of said barrel member and said plunger are in opposed directions and at different rates so as to retract the latter onto the former during conjoint rotation of said barrel member and said sleeve member.

9. A micrometric translating device comprising:
(A) a support member;
(B) a tubular barrel member threadedly mounted in said support member for axial movement therein upon rotation of said barrel member;
(C) an internally threaded sleeve member rotationally mounted within said barrel member in fixed axial relationship therein;
(D) a plunger threadedly mounted in said sleeve member and adapted for axial movement in said sleeve member upon rotation thereof within and in opposite direction of said barrel member so as to retract in the latter;
(E) means operatively connected between said support member and said plunger for preventing rotation of the latter;
(F) drive means operatively connected to said barrel member for rotation thereof into said axial movement relative to said support member; and
(G) clutch means for selectively and operatively connecting and disconnecting said drive means to said sleeve member for rotation thereof during connection with said drive means adapted to axially move said plunger relative to said sleeve member and said barrel member.

10. The device of claim 9 wherein said barrel member and said plunger are adapted to be axially moved at different rates to effect differential movement of said device.

References Cited

UNITED STATES PATENTS 3,131,464 5/1964 Weigel.

THOMAS H. EAGER, Primary Examiner

U.S. Cl. X.R.

29—203